United States Patent
Kim et al.

(10) Patent No.: US 9,249,361 B2
(45) Date of Patent: Feb. 2, 2016

(54) METHOD FOR SYNTHESIS OF MOLYBDENUM CARBIDE CATALYST FOR HYDRODEOXYGENATION

(71) Applicant: KOREA INSTITUTE OF SCIENCE AND TECHNOLOGY, Seoul (KR)

(72) Inventors: Jaehoon Kim, Seoul (KR); Jong Min Park, Seoul (KR); Seok Ki Kim, Seoul (KR); Moon Hyeun Hong, Gyeonggi-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 205 days.

(21) Appl. No.: 13/894,569

(22) Filed: May 15, 2013

(65) Prior Publication Data
US 2014/0221706 A1  Aug. 7, 2014

(30) Foreign Application Priority Data
Feb. 5, 2013 (KR) .................. 10-2013-0013015

(51) Int. Cl.
| | | |
|---|---|---|
| *B01J 21/00* | (2006.01) | |
| *B01J 23/00* | (2006.01) | |
| *B01J 25/00* | (2006.01) | |
| *B01J 29/00* | (2006.01) | |
| *B01J 21/18* | (2006.01) | |
| *B01J 27/20* | (2006.01) | |
| *B01J 27/22* | (2006.01) | |
| *C10G 3/00* | (2006.01) | |
| *C10L 1/04* | (2006.01) | |
| *B01J 37/18* | (2006.01) | |
| *B01J 37/08* | (2006.01) | |

(Continued)

(52) U.S. Cl.
CPC . *C10G 3/48* (2013.01); *B01J 27/22* (2013.01); *B01J 37/18* (2013.01); *C10G 3/44* (2013.01); *C10G 3/50* (2013.01); *C10L 1/04* (2013.01); *B01J 23/28* (2013.01); *B01J 35/1019* (2013.01); *B01J 35/1023* (2013.01); *B01J 37/08* (2013.01); *C10G 2300/1011* (2013.01); *Y02E 50/13* (2013.01)

(58) Field of Classification Search
USPC ........................................ 502/177, 100, 174
See application file for complete search history.

(56) References Cited

U.S. PATENT DOCUMENTS

| | | | | |
|---|---|---|---|---|
| 4,325,842 A * | 4/1982 | Slaugh et al. ............ | B01J 27/22 502/177 |
| 4,554,397 A * | 11/1985 | Stern et al. ............... | B01J 25/02 585/638 |

(Continued)

FOREIGN PATENT DOCUMENTS

| | | |
|---|---|---|
| KR | 100907214 B1 | 7/2009 |
| KR | 1020110115793 A | 10/2011 |

OTHER PUBLICATIONS

Xu, "Continuous and Batch Hydrothermal Synthesis of Metal Oxide Nanoparticles and Metal Oxide-Activated Carbon Nanocomposites", a dissertation, Georgia institute of Technology, 2006).*

(Continued)

*Primary Examiner* — James McDonough
(74) *Attorney, Agent, or Firm* — Ladas & Parry LLP

(57) ABSTRACT

The present disclosure relates to a molybdenum carbide catalyst used in a process for preparing hydrocarbons, in particular diesel-grade hydrocarbons, from biooils and fatty acids released therefrom through hydrodeoxygenation and a method for preparing same.

8 Claims, 5 Drawing Sheets

(51) Int. Cl.
  *B01J 23/28*  (2006.01)
  *B01J 35/10*  (2006.01)

(56) References Cited

U.S. PATENT DOCUMENTS

| | | | | |
|---|---|---|---|---|
| 4,992,605 A * | 2/1991 | Craig et al. | ............... | C10L 1/04 44/389 |
| 5,705,722 A * | 1/1998 | Monnier et al. | .......... | C07C 1/00 585/240 |
| 7,390,920 B2 * | 6/2008 | Coleman et al. | ......... | B01J 21/18 558/145 |
| 2005/0176990 A1 * | 8/2005 | Coleman et al. | ................ | 562/11 |

OTHER PUBLICATIONS

Edward Furimsky; "Metal carbides and nitrides as potential catalysts for hydroprocessing", Applied Catalysis A: General vol. 240; Issues 1-2, pp. 1-28; Feb. 2003.

Bambang Veriansyah, et al; "Production of renewable diesel by hydroprocessing of soybean oil: Effect of catalysts", Fuel, vol. 94, pp. 578-585; Available online Nov. 7, 2011.

David Kubicka, et al; "Deactivation of HDS catalysts in deoxygenation of vegetable oils", Applied Catalysis A: General vol. 394, pp. 9-17; Available online Nov. 5, 2010.

* cited by examiner

METHOD FOR SYNTHESIS OF MOLYBDENUM CARBIDE CATALYST FOR HYDRODEOXYGENATION

CROSS-REFERENCE TO RELATED APPLICATIONS

This application claims priority under 35 U.S.C. §119 to Korean Patent Application No. 10-2013-0013015, filed on Feb. 5, 2013, in the Korean Intellectual Property Office, the disclosure of which is incorporated herein by reference in its entirety.

TECHNICAL FIELD

The present disclosure relates to a molybdenum carbide catalyst used in a process for preparing hydrocarbons, in particular diesel-grade hydrocarbons, from biooils and fatty acids released therefrom through hydrodeoxygenation and a method for preparing same.

TECHNICAL FIELD

Recently, with increased concerns about depletion of energy resources and environmental pollution owing to excessive consumption of fossil fuels, use of renewable, sustainable and ecofriendly non-fossil fuels is rapidly increasing. Diesel fuels based on biological resources such as plant or animal oil are researched a lot globally as the most practicable renewable energy source.

The existing attempts to convert plant and animal oils or fatty acid derivatives released therefrom to liquid fuels involve transesterification of the biomaterials with methanol using acid or alkali catalysts to produce fatty acid methyl esters (FAMEs).

The FAME-based biodiesel is advantageous in that it is applicable to the existing vehicle engines without change in structure or mechanism. However, because the FAME-based biodiesel contains an ester group having a double bond and oxygen atoms, the fuel has a stability problem such as sludge formation or sedimentation when stored for a long time. Also, the FAME molecules may cause softening, swelling and cracking of rubbers used to seal the engine parts or fuel supply parts, thus leading to leakage when used for a long time. The FAME-based biodiesel is fairly soluble in water because of the oxygen atoms included in the FAMEs and residual free fatty acids may lead to corrosion of metal parts such as internal control line or fuel injection nozzle of diesel vehicles. In addition, due to the oxygen atoms included in the FAMEs, it is known to emit more NOx as compared to fossil-based diesel fuels. Furthermore, it is difficult to separate the impurities included in the FAMEs, including free fatty acids and catalysts.

Therefore, various methods have been presented for preparation of oxygen-free renewable fuels having the same chemical structure as existing fossil fuels in order to solve the above problems.

As a method for preparing oxygen-free hydrocarbons from oil or fat, hydrodeoxygenation using hydrogen and an appropriate heterogeneous catalyst is known. According to this method, the double bond included in the oil or fat is saturated to a single bond and then an oxygen-free renewable fuel is prepared by hydrodeoxygenation.

The hydrodeoxygenation process of oil or fat involves three major reactions. They are decarboxylation, decarbonylation and hydrodeoxygenation.

When the oxygen atoms included in fatty acid derivatives are removed by decarboxylation or decarbonylation, carbon oxides ($CO_2$ and $CO$) and hydrocarbons having one less carbon atom than the original fatty acid molecules are formed. In hydrodeoxygenation, water is produced as the oxygen atoms included in fatty acid derivatives are removed by hydrogen and hydrocarbons are formed without loss of carbon atoms. Accordingly, since the products do not contain oxygen atoms and few impurities are included, unlike the FAME-based biodiesels, most of the problems of the FAME-based biodiesels can be solved.

U.S. Pat. No. 4,992,605 discloses a method for producing $C_{15}$-$C_{17}$ paraffins useful as diesel fuel by hydroprocessing canola oil, sunflower oil or rapeseed oil using sulfurized cobalt-molybdenum (Co—Mo) as catalyst and U.S. Pat. No. 5,705,722 discloses a method for preparing additives for diesel fuels having high cetane numbers by hydroprocessing relatively inexpensive oil or fat such as tall oil, used cooking oil, animal oil or fat, etc. and sulfurized nickel-molybdenum (Ni—Mo) supported on alumina as catalyst. However, the sulfurized Co—Mo or sulfurized Ni—Mo catalysts used in these patents are typical desulfurization catalysts originally developed for hydrodesulfurization of removing sulfur included in large quantities in refined petroleum products from petroleum refineries or petrochemical plants. The catalysts need to be activated before the reaction by introducing sulfides, typically very noxious hydrogen sulfide ($H_2S$). And, when the catalysts are used to remove oxygen from oxygen-containing organic compounds, $H_2S$ is often produced from the reaction between the sulfur contained in the catalyst and the reactant hydrogen or the sulfur is removed as being replaced by the product. As a result, the catalyst is rapidly deactivated and the yield is decreased.

To overcome this problem, addition of various sulfur components (e.g., dimethyl disulfide) to biomaterials to prevent deactivation of catalysts during hydrodeoxygenation has been reported (Kubicka, D; Horacek, J. Deactivation of HDS catalysts in deoxygenation of vegetable oils, *Applied Catalysis, A: General*, 394 (2011), 9-17). However, because the use of dimethyl disulfide in hydrodeoxygenation of biomaterials means consistent supply of sulfur, this method is limited in the preparation of ecofriendly renewable fuels. For example, as described above, emission of $H_2S$ produced during the hydrodeoxygenation of biomaterials or SOx produced during combustion of the sulfur-substituted hydrocarbons to the atmosphere results in increased sulfur concentration in the air. Therefore, use of the sulfurized Co—Mo or sulfurized Ni—Mo catalyst for hydrodeoxygenation of biomaterials is not desirable.

Thus, for conversion of oils or fats to hydrocarbons by hydrodeoxygenation, catalysts not requiring sulfurization have been developed as an alternative to the sulfurized Co—Mo or sulfurized Ni—Mo catalyst. Veriansyah, B. et al. report a conversion rate of at least 90% by using catalysts in which metals such as Ni, Pd, Ru, Pt, etc. or nonmetals are supported on oxides with high specific surface area for hydrodeoxygenation of soybean oil (Veriansyah, B. et al., Production of renewable diesel by hydroprocessing of soybean oil: Effect of catalysts, *Fuel*, 94 (2012), 578-585) and U.S. Pat. No. 4,554,397 discloses a process for preparing linear olefins from saturated fatty acids or esters using a catalyst system comprising Ni and at least one metal selected from a group consisting of Pb, Sn and Ge. However, the noble metal-supported catalyst is expensive and many side reactions occur vigorously in addition to hydrodeoxygenation because of very high reactivity of the catalyst. For example, $CO_2$ or $CO$ produced as byproduct of decarboxylation or decarbonylation reacts with the reactant hydrogen by methanation or water-gas shift reaction on the noble metal catalyst, thereby wasting the expensive hydrogen.

As described above, various new catalysts have been developed to overcome the disadvantages of the sulfurized molybdenum-based catalysts and noble metal catalysts in hydrodeoxygenation of oils or fats. In particular, catalysts on which metal carbides, typically molybdenum carbide or tungsten carbide, are supported have been shown to give hydrocarbons with high yield in hydrodeoxygenation of oxygen-containing organic compounds without production of sulfur or occurrence of vigorous side reactions (Furimsky, E. Metal carbides and nitrides as potential catalysts for hydroprocessing, *Applied Catalysis, A: General*, 240 (2003), 1-28).

The existing metal carbide catalyst is prepared by supporting metal oxide on a support and treating at high temperature while flowing a mixture gas of a low-carbon hydrocarbon, typically methane, ethane or propane, and hydrogen. However, because the formation of the active phase of metal carbide is sensitive to the concentration of the hydrocarbon used, as well as heating speed, temperature and heating time, and because carbon deposition often occurs on the metal surface, this method is not suitable for preparation of a catalyst effective for hydrodeoxygenation.

As the support of the catalyst used for hydrodeoxygenation of oxygen-containing organic compounds, porous metal oxide and carbon has been typically used. However, the existing catalyst prepared by the impregnation method is limited in uniformly supporting metal deep into the nanosized pores of the porous metal oxide or carbon because of the high viscosity and surface tension of the solvent used. Especially, the carbon support shows aggregation and sintering of particles, failing to be uniformly dispersed, because of the hydrophobicity of the surface. Consequently, when a catalyst prepared by this method is used for preparation of renewable diesel by hydrodeoxygenation, the yield is low.

Accordingly, there is a need of a new molybdenum carbide catalyst allowing conversion of biomass, i.e. biooil and fatty acids released therefrom, to hydrocarbons by hydrodeoxygenation without requiring sulfurization and with less side reactions and an effective method for preparing same.

BACKGROUND

The present disclosure is directed to providing a novel molybdenum carbide-supported catalyst for hydrodeoxygenation capable of solving the problems of the existing hydrodeoxygenation catalyst.

The present disclosure is also directed to providing a method for preparing the molybdenum carbide-supported catalyst for hydrodeoxygenation.

The present disclosure is also directed to providing a method for preparing a renewable fuel using the molybdenum carbide-supported catalyst for hydrodeoxygenation.

In one general aspect, there is provided a molybdenum carbide-supported catalyst for hydrodeoxygenation, containing molybdenum in the molybdenum carbide-supported catalyst.

In another general aspect, there is provided a method for preparing the molybdenum carbide-supported catalyst, including:

(a) dissolving a molybdenum precursor in a solvent, adding a carbon support to prepare a suspension and obtaining a carbon support on which molybdenum oxide particles are supported by supercritical solvent thermal synthesis; and (b) converting the molybdenum oxide particles supported on the carbon support to molybdenum carbide in a continuous reactor to obtain the molybdenum carbide-supported catalyst.

In another general aspect, there is provided a method for preparing a renewable fuel using the molybdenum carbide-supported catalyst, including:

(a) activating the molybdenum carbide-supported catalyst by adding the catalyst and hydrogen to a continuous reactor; and (b) adding an oxygen-containing organic compound and hydrogen to the continuous reactor containing the activated catalyst and performing hydrodeoxygenation to obtain a hydrocarbon compound.

Since the molybdenum carbide-supported catalyst according to the present disclosure allows easy formation of molybdenum carbide nanoparticles with high dispersibility using a supercritical solvent, hydrocarbons can be obtained with higher yield from oxygen-containing organic compounds. Furthermore, since sulfur compounds are not used for activation and performance maintenance of the catalyst unlike the existing catalysts, the hydrodeoxygenation process is ecofriendly with no emission of sulfur compounds. And, there is an economic advantage since consumption of hydrogen owing to vigorous side reactions such as methanation or water-gas shift reaction occurring when the existing noble metal catalysts are used can be reduced. In addition, since an oxygen-free renewable fuel is prepared, the problems associated with the use of the existing gasoline, diesel or FAME-based biodiesel can be solved.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1:
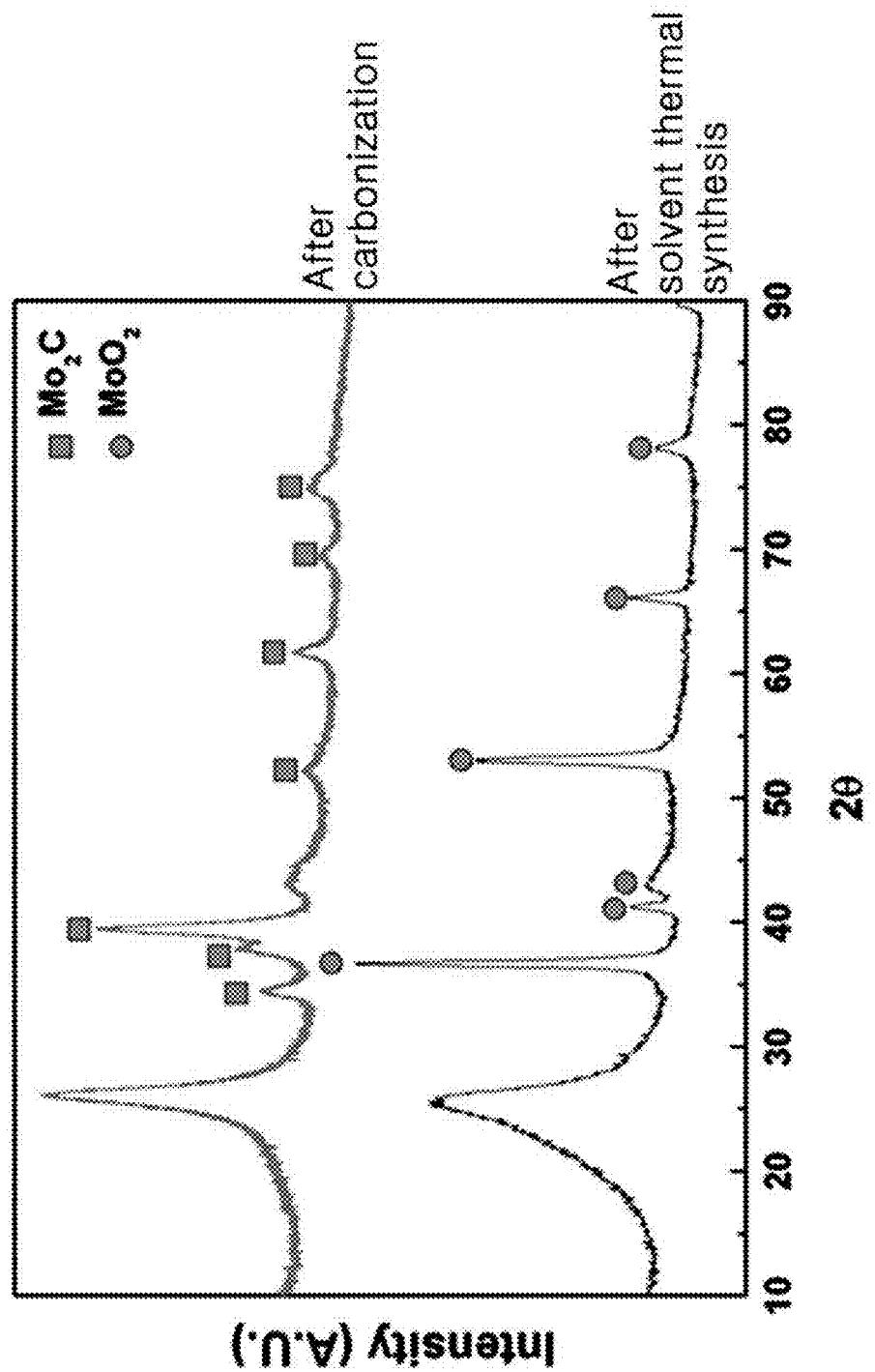
FIG. 1 shows X-ray diffraction patterns of a molybdenum oxide-supported catalyst and a molybdenum carbide-supported catalyst converted therefrom according to an exemplary embodiment of the present disclosure.

Hereinafter, exemplary embodiments will be described in detail with reference to the accompanying drawings.

The present disclosure provides a molybdenum carbide-supported catalyst for hydrodeoxygenation, containing molybdenum in the molybdenum carbide-supported catalyst.

Specifically, the molybdenum carbide-supported catalyst according to the present disclosure may contain 15-20 wt % of molybdenum.

If the content of molybdenum is less than 15 wt %, it is difficult to obtain hydrocarbons with high yield through hydrodeoxygenation because of a small number of catalytic active sites. And, if the content exceeds 20 wt %, molybdenum carbide particles may aggregate with each other, resulting in larger particle size and decreased active surface area.

The molybdenum carbide may be supported on a carbon support and the carbon support may be a porous support having a surface area of 100-1,000 m$^2$/g.

If the surface area of the carbon support is smaller than 100 m$^2$/g, molybdenum particles may not be uniformly dispersed but be sintered during supercritical solvent thermal synthesis and yield of hydrocarbons may be low because of small contact area during hydrodesulfurization of an oxygen-containing organic compound. And, if the surface area of the carbon support exceeds 1,000 m$^2$/g, it is difficult to use the catalyst for a fixed-bed reactor because of low density.

The carbon support may be activated charcoal, mesoporous carbon, graphite, carbon nanotube, graphene, fullerene or a mixture thereof.

The present disclosure further provides a method for preparing a molybdenum carbide-supported catalyst, including:

(a) dissolving a molybdenum precursor in a solvent, adding a carbon support to prepare a suspension and obtaining a carbon support on which molybdenum oxide particles are supported by supercritical solvent thermal synthesis; and (b) converting the molybdenum oxide particles supported on the carbon support to molybdenum carbide in a continuous reactor to obtain the molybdenum carbide-supported catalyst.

In (a), a molybdenum oxide-supported support is obtained by supercritical solvent thermal synthesis.

In the supercritical solvent thermal synthesis of (a), a $C_1$-$C_{10}$ alcohol may be used as a supercritical solvent.

Specifically, methanol (critical temperature=239° C.; critical pressure=81 bar), ethanol (critical temperature=241° C.; critical pressure=63 bar), propanol (or propan-1-ol, critical temperature=264° C.; critical pressure=52 bar), isopropyl alcohol (or propan-2-ol, critical temperature=307° C.; critical pressure=41 bar), n-butanol (or butan-1-ol, critical temperature=289° C.; critical pressure=45 bar), isobutanol (or 2-methylpropan-1-ol, critical temperature=275° C.; critical pressure=45 bar), 2-butanol (or butan-2-ol, critical temperature=263° C.; critical pressure=42 bar), tert-butanol (or 2-methyl-2-propanol, critical temperature=233° C.; critical pressure=40 bar), n-pentanol (or pentan-1-ol, critical temperature=307° C.; critical pressure=bar), isopentyl alcohol (or 3-methyl-1-butanol, critical temperature=306° C.; critical pressure=39 bar), 2-methyl-1-butanol (critical temperature=302° C.; critical pressure=39 bar), neopentyl alcohol (or 2,2-dimethyl-1-propanol, critical temperature=276° C.; critical pressure=40 bar), diethyl carbinol (or 3-pentanol, critical temperature=286° C.; critical pressure=39 bar), methyl propyl carbinol (or 2-pentanol, critical temperature=287° C.; critical pressure=37 bar), methyl isopropyl carbinol (or 3-methyl-2-butanol, critical temperature=283° C.; critical pressure=39 bar), dimethyl ethyl carbinol (or 2-methyl-2-butanol, critical temperature=271° C.; critical pressure=37 bar), 1-hexanol (critical temperature=337° C.; critical pressure=34 bar), 2-hexanol (critical temperature=310° C.; critical pressure=33 bar), 3-hexanol (critical temperature=309° C.; critical pressure=34 bar), 2-methyl-1-pentanol (critical temperature=331° C.; critical pressure=35 bar), 3-methyl-1-pentanol (critical temperature=387° C.; critical pressure=30 bar), 4-methyl-1-pentanol (critical temperature=330° C.; critical pressure=30 bar), 2-methyl-2-pentanol (critical temperature=286° C.; critical pressure=36 bar), 3-methyl-2-pentanol (critical temperature=333° C.; critical pressure=36 bar), 4-methyl-2-pentanol (critical temperature=301° C.; critical pressure=35 bar), 2-methyl-3-pentanol (critical temperature=303° C.; critical pressure=35 bar), 3-methyl-3-pentanol (critical temperature=302° C.; critical pressure=35 bar), 2,2-dimethyl-1-butanol (critical temperature=301° C.; critical pressure=35 bar), 2,3-dimethyl-1-butanol (critical temperature=331° C.; critical pressure=35 bar), 2,3-dimethyl-2-butanol (critical temperature=331° C.; critical pressure=35 bar), 3,3-dimethyl-1-butanol (critical temperature=331° C.; critical pressure=35 bar), 2-ethyl-1-butanol (critical temperature=307° C.; critical pressure=34 bar), 1-heptanol (critical temperature=360° C.; critical pressure=31 bar), 2-heptanol (critical temperature=335° C.; critical pressure=30 bar), 3-heptanol (critical temperature=332° C.; critical pressure=30 bar), 4-heptanol (critical temperature=329° C.; critical pressure=30 bar), etc. may be used.

Specifically, the molybdenum precursor in (a) may be molybdenyl acetylacetonate, molybdenum hexacarbonyl or molybdenum chloride, although not being particularly limited thereto.

The supercritical solvent thermal synthesis in (a) may be performed at 200-600° C. after adding the suspension to the reactor in an amount of 0.1-1.0 g/mL.

If the amount of the suspension is less than 0.2 g/mL or if the reaction temperature is lower than 200° C., molybdenum particles may not be uniformly dispersed in the pores of the carbon support because the solvent in the reactor may not enter the supercritical phase and the precursor may not be dissociated because the temperature is too low. And, if the amount of the suspension exceeds 1.0 g/mL or if the reaction temperature is higher than 600° C., the supercritical solvent may be degraded and explode due to the high pressure and temperature.

In (b), the temperature inside the continuous reactor may be raised at a rate of 1-10° C./min and the reaction may be performed at 400-900° C.

Outside the above ranges, particularly, if the temperature inside the continuous reactor is raised at a rate exceeding 10° C./min or if the reaction temperature is lower than 400° C., conversion to molybdenum carbide may not be achieved.

Since the molybdenum carbide-supported catalyst according to the present disclosure prepared by the above-described method has a tendency to ignite spontaneously at room temperature, an oxide film may be formed using a gas mixture containing less than 1% of oxygen before recovering the catalyst.

The present disclosure further provides a method for preparing a renewable fuel, including:

(a) activating the molybdenum carbide-supported catalyst according to the present disclosure by adding the catalyst and hydrogen to a continuous reactor; and (b) adding an oxygen-containing organic compound and hydrogen to the continuous reactor containing the activated catalyst and performing hydrodeoxygenation to obtain a hydrocarbon compound.

Figure 3:
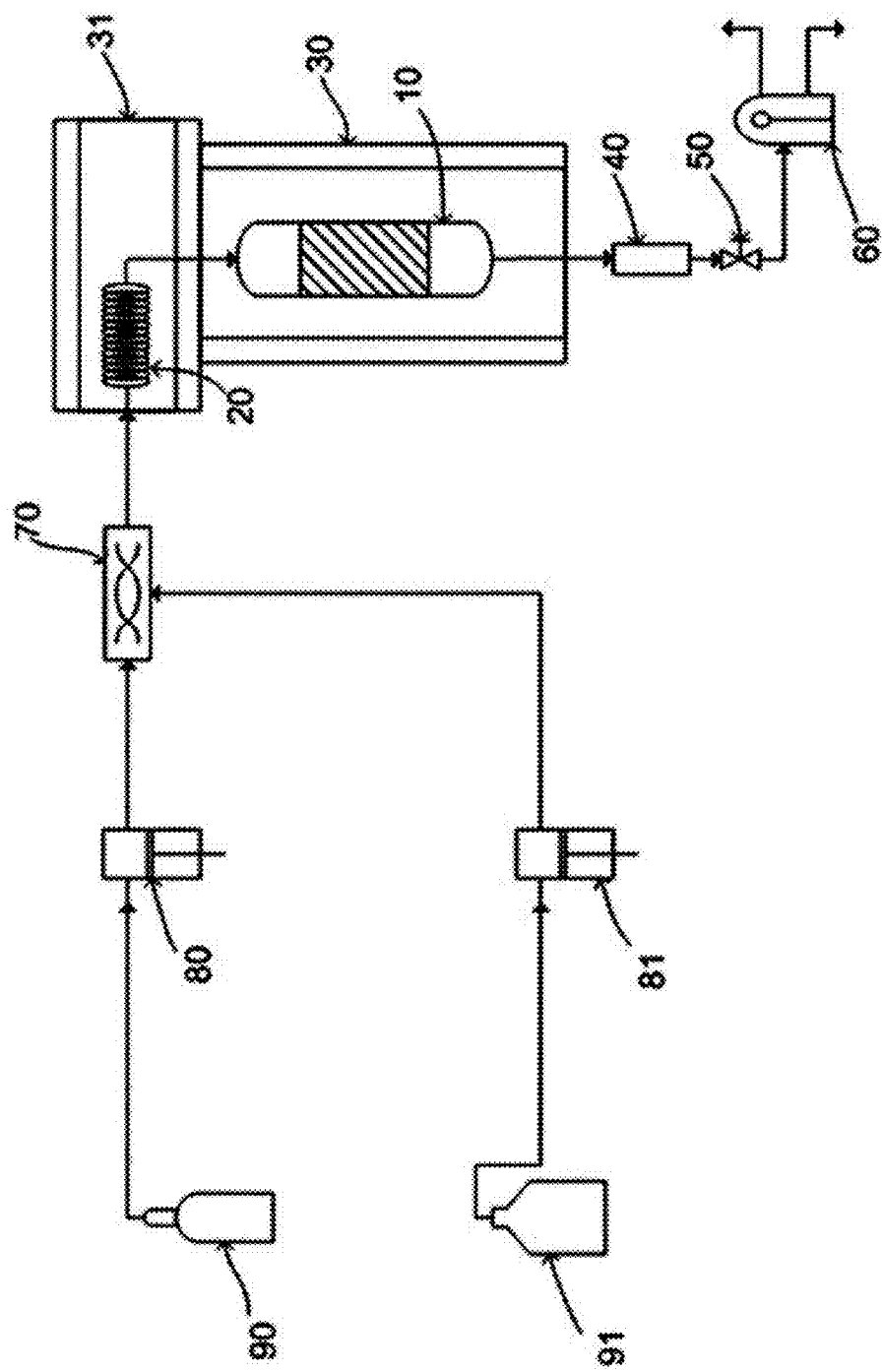
FIG. 3 schematically shows a process of preparing a hydrocarbon-based renewable fuel by adding an oxygen-containing organic compound and hydrogen to a continuous reactor containing a molybdenum carbide catalyst according to an exemplary embodiment of the present disclosure.

As shown in FIG. 3, in accordance with the present disclosure, the hydrodeoxygenation is performed in a continuous reactor 10 containing an activated molybdenum carbide-supported catalyst as hydrogen and an oxygen-containing organic compound supplied respectively from a hydrogen reservoir 100 and an oxygen-containing organic compound reservoir 101 are added to the continuous reactor after being mixed by a mixer 70. Hydrogenation and hydrodeoxygenation products are separated and recovered from the continuous reactor 10. The products, which are carbon dioxide and carbon monoxide in gas state and water and a renewable fuel in liquid state, are passed through a condenser 40 and a gas-liquid separator 60 and then discharged by a decompressor at the outlet.

In (a) of the method for preparing a renewable fuel according to the present disclosure, the molybdenum carbide-supported catalyst according to the present disclosure is activated by adding hydrogen to a continuous reactor containing the catalyst.

In (a), the catalyst may be activated at 300-500° C. for 1-2 hours.

Outside the above ranges, particularly, if the catalyst activation temperature is below 300° C., the oxide film formed to store the molybdenum carbide-supported catalyst may not be removed. And, if the temperature is above 500° C., active surface area may decrease due to sintering of molybdenum particles.

And, the hydrogen may be supplied at a rate of 10-100 mL/min.

The hydrogen serves a very important role of activating the molybdenum carbide-supported catalyst according to the present disclosure. If the hydrogen supply rate is lower than 10 mL/min, the catalyst may not be activated due to insufficient hydrogen supply. And, if it exceeds 100 mL/min, enough contact time for activation may not be ensured.

In (b) of the method for preparing a renewable fuel according to the present disclosure, a renewable fuel containing a hydrocarbon compound is obtained by performing hydrodeoxygenation.

Very importantly, the hydrodeoxygenation is performed at 250-400° C. In the temperature range of 250-400° C., oxygen included in the oxygen-containing organic compound can be removed by decarboxylation, decarbonylation and hydrodeoxygenation to give a $C_{10}$-$C_{20}$ hydrocarbon compound (for example, renewable diesel) as main product. Outside this range, particularly, if the reaction is performed below 250° C., the olefin or unsaturated group existing in the oxygen-containing organic compound may be saturated by hydrogenation to give a paraffin.

And, in the method for preparing a renewable fuel according to the present disclosure, the hydrodeoxygenation in (b) is performed at a hydrogen pressure of 30-100 bar.

If the hydrogen pressure is lower than 30 bar, hydrogen may not be effectively introduced into the oxygen-containing organic compound. And, if the hydrogen pressure exceeds 100 bar, excess hydrogen is used without improvement in the yield of the renewable fuel and conversion rate to the renewable diesel may decrease because the production of water, $CO_2$, CO, etc. is inhibited.

And, in (b), the rate at which the oxygen-containing organic compound and the hydrogen are passed through the catalyst per unit volume and per unit time may be 0.1-20 $h^{-1}$, specifically 0.1-10 $h^{-1}$.

If the rate at which the oxygen-containing organic compound and the hydrogen are passed through the catalyst per unit volume and per unit time (liquid hourly space velocity; LHSV) is below 0.1 $h^{-1}$, the catalyst may not be catalyzed because of coking of the catalyst, thus resulting in decreased yield of renewable fuel. And, if the rate exceeds 20 $h^{-1}$, hydrodeoxygenation may not be performed sufficiently because of short contact time of the supercritical solvent with the catalyst.

In (b), the oxygen-containing organic compound may be: one or more plant oil or fat selected from a group consisting of palm oil, corn oil, sunflower oil, olive oil, soybean oil, rapeseed oil, cottonseed oil, rice bran oil and coconut oil; one or more animal oil or fat selected from a group consisting of cow fat, pig fat, sheep fat and fish oil; or one or more selected from a group consisting of oleic acid, palmitoleic acid and erucic acid, which are released therefrom.

Since the molybdenum carbide-supported catalyst according to the present disclosure allows easy formation of molybdenum carbide nanoparticles with high dispersibility using a supercritical solvent, hydrocarbons can be obtained with higher yield from oxygen-containing organic compounds. Furthermore, since sulfur compounds are not used for activation and performance maintenance of the catalyst unlike the existing catalysts, the hydrodeoxygenation process is ecofriendly with no emission of sulfur compounds. And, there is an economic advantage since consumption of hydrogen owing to vigorous side reactions such as methanation or water-gas shift reaction occurring when the existing noble metal catalysts are used can be reduced. In addition, since an oxygen-free renewable fuel is prepared, the problems associated with the use of the existing gasoline, diesel or FAME-based biodiesel can be solved.

EXAMPLES

Hereinafter, the present disclosure will be described in more detail through examples and test examples.

However, the following examples and test examples are for illustrative purposes only and not intended to limit the scope of this disclosure.

Example 1

Preparation of Molybdenum Carbide-supported Catalyst ($Mo_2C/AC$)

Step 1: Preparation of Molybdenum Oxide-Supported Catalyst

Before preparing a molybdenum carbide-supported catalyst, a molybdenum oxide-supported catalyst was prepared by supercritical solvent thermal synthesis.

0.5 g of activated charcoal and 0.29 g (17 wt %) of molybdenyl acetylacetonate were added to 10 mL of 2-propanol and molybdenyl acetylacetonate was added as a molybdenum precursor to prepare a suspension. The suspension was added to a 20-mL batch reactor and supercritical solvent thermal synthesis was performed for 30 minutes in a salt bath preheated to 400° C. After cooling in a water bath, the suspension was recovered from the batch reactor, washed with methanol and then dried to obtain a molybdenum oxide catalyst supported on activated charcoal.

Step 2: Preparation of Molybdenum Carbide-supported Catalyst ($Mo_2C/AC$)

The molybdenum oxide catalyst supported on activated charcoal obtained in the step 1 was added to a 950-mL continuous reactor and then hydrogen was flown. After heating the continuous reactor to 600° C. at a rate of 5° C./min, the molybdenum oxide was converted to molybdenum carbide for 2 hours while maintaining the temperature. After the carbonization was completed, the reactor was cooled to room temperature and a mixture gas of about 1% oxygen mixed with argon was flown for 1 hour to obtain a molybdenum carbide-supported catalyst ($Mo_2C/AC$) coated with an oxide film.

Example 2

Preparation of Molybdenum Carbide-supported Catalyst ($Mo_2C/MC$)

A molybdenum carbide-supported catalyst ($Mo_2C/MC$) was obtained in the same manner as in Example 1, except for using mesoporous carbon instead of activated charcoal as the carbon support in the step 1.

Example 3

Preparation of Molybdenum Carbide-supported Catalyst ($Mo_2C/GNS$)

A molybdenum carbide-supported catalyst ($Mo_2C/GNS$) was obtained in the same manner as in Example 1, except for using graphene instead of activated charcoal as the carbon support in the step 1.

Example 4

Preparation of Renewable Fuel Using Molybdenum Carbide-supported Catalyst ($Mo_2C/AC$)

0.5 g of the molybdenum carbide-supported catalyst ($Mo_2C/AC$, 17 wt % Mo) prepared in Example 1 was added to a 45-mL continuous reactor and activated at 400° C. by flowing hydrogen for 2 hours at a rate of 50 mL/min. After the catalyst activation was completed, the temperature was lowered to 350° C. and oleic acid was introduced as an oxygen-containing organic compound. Hydrogen and the oleic acid was introduced to the continuous reactor at a molar ratio of 4:1. With hydrogen pressure fixed at 50 bar, a renewable fuel discharged at the outlet was collected while varying the rate at which the oxygen-containing organic compound and the hydrogen are passed through the catalyst per unit volume and per unit time from 2.0 to 4.0, 6.0 and 8.0 $h^{-1}$.

Example 5

Preparation of Renewable Fuel Using Molybdenum Carbide-supported Catalyst ($Mo_2C/MC$)

A renewable fuel was obtained in the same manner as in Example 4, except for using the $Mo_2C/MC$ catalyst prepared in Example 2 instead of the $Mo_2C/AC$ catalyst of Example 1.

Example 6

Preparation of Renewable Fuel Using Molybdenum Carbide-supported Catalyst ($Mo_2C/GNS$)

A renewable fuel was obtained in the same manner as in Example 4, except for using the $Mo_2C/GNS$ catalyst prepared in Example 3 instead of the $Mo_2C/AC$ catalyst of Example 1.

Comparative Example 1

Preparation of Renewable Fuel Using Co—$Mo/Al_2O_3$ Catalyst

A renewable fuel was obtained in the same manner as in Example 4, except for using an existing Co—$Mo/Al_2O_3$ catalyst (Co, 2.8 wt %; Mo, 7.6 wt %) and a mixture gas of 15% hydrogen sulfide mixed with hydrogen instead of the $Mo_2C/AC$ catalyst of Example 1 and hydrogen.

Test Example 1

X-Ray Diffraction Analysis of Molybdenum Carbide-Supported Catalyst

X-ray diffraction pattern was analyzed to investigate whether molybdenum oxide was converted to molybdenum carbide in Example 1. The X-ray diffraction pattern was measured using SAXSess (Anton Paar).

Result

As seen from FIG. 1, it was confirmed that the molybdenum oxide-supported catalyst prepared in the step 1 of Example 1 was converted to the molybdenum carbide-supported catalyst in the step 2 through carbonization.

Test Example 2

Scanning Electron Microscopic Analysis of Molybdenum Carbide-supported Catalyst

The morphology of the molybdenum carbide-supported catalyst prepared in Example 3 was analyzed using a scanning electron microscope (Nova NanoSEM, FEI).

Result

Figure 2:
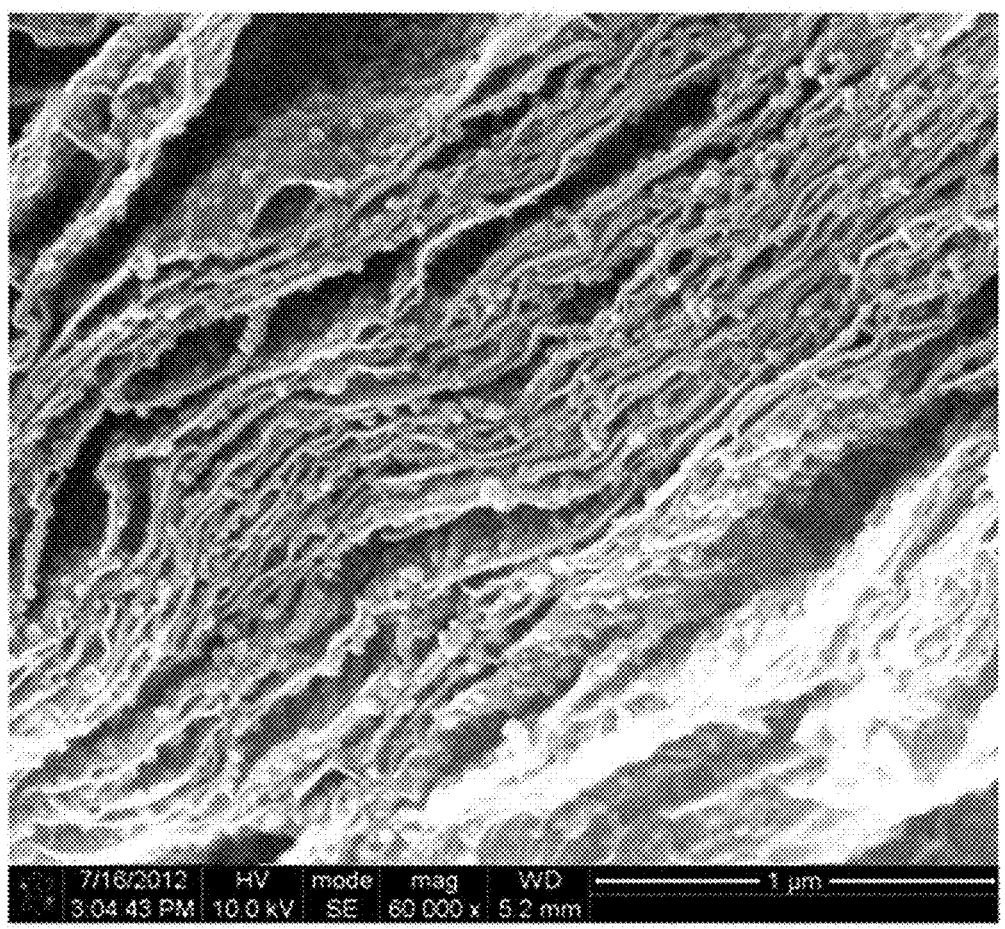
FIG. 2 shows scanning electron microscopic images of a molybdenum carbide catalyst according to an exemplary embodiment of the present disclosure.

As seen from FIG. 2, molybdenum carbide particles were dispersed in the 2-dimensional carbonaceous structure of graphene with uniform particle size. In spite of the very short distance between the 2-dimensional carbonaceous structures, the molybdenum carbide particles obtained by supercritical solvent thermal synthesis were uniformly dispersed in the carbonaceous structures.

Test Example 1

Quantitative Measurement of Oleic Acid and Hydrocarbon

For the renewable fuels, i.e. hydrocarbons, prepared in Examples 4-6 and Comparative Example 1, oleic acid conversion rate and hydrocarbon selectivity were calculated using the following equations. The oleic acid and the hydrocarbon were quantitated by gas chromatography equipped with a flame ionization detector (Agilent).

$$\text{Conversion rate}(\%) = (\text{Wt \% of converted oleic acid})/(\text{Wt \% of supplied oleic acid}) \quad \text{Equation 1}$$

$$\text{Hydrocarbon selectivity} = (\text{Wt \% of produced hydrocarbon})/(\text{Wt \% of converted oleic acid}) \quad \text{Equation 2}$$

Result

Figure 4:
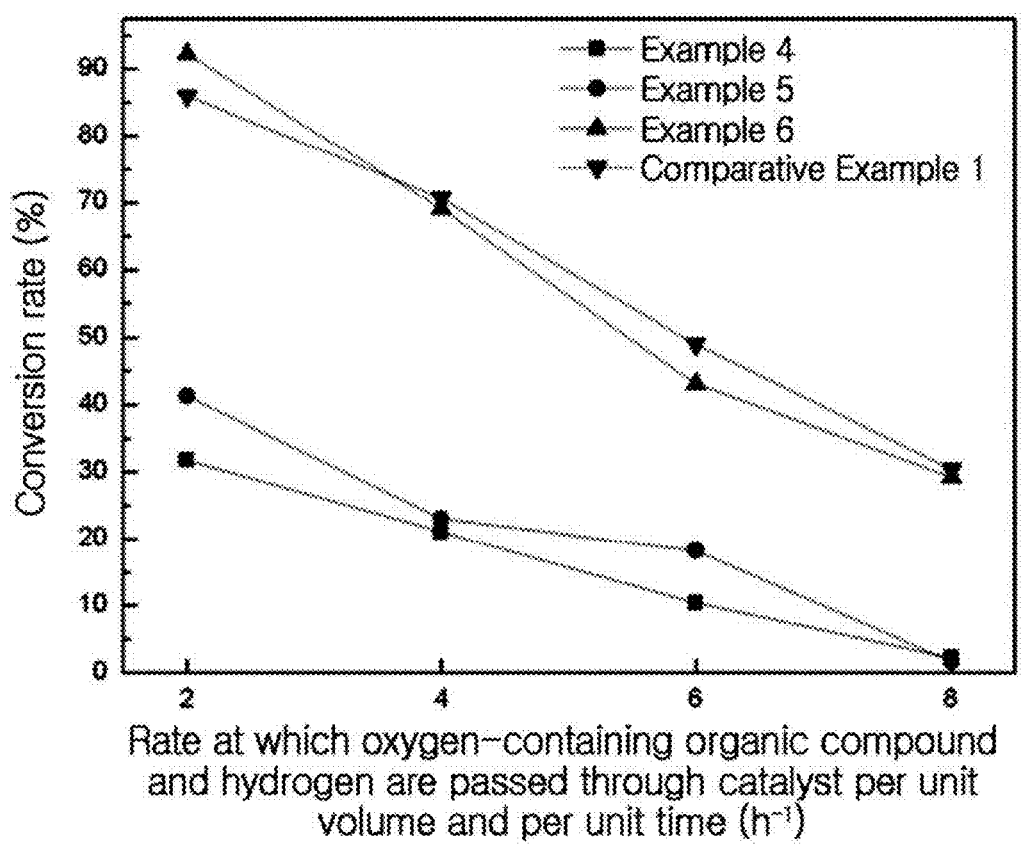
FIG. 4 shows conversion rate of oleic acid converted using a catalyst according to an exemplary embodiment of the present disclosure or an existing catalyst.
Figure 5:
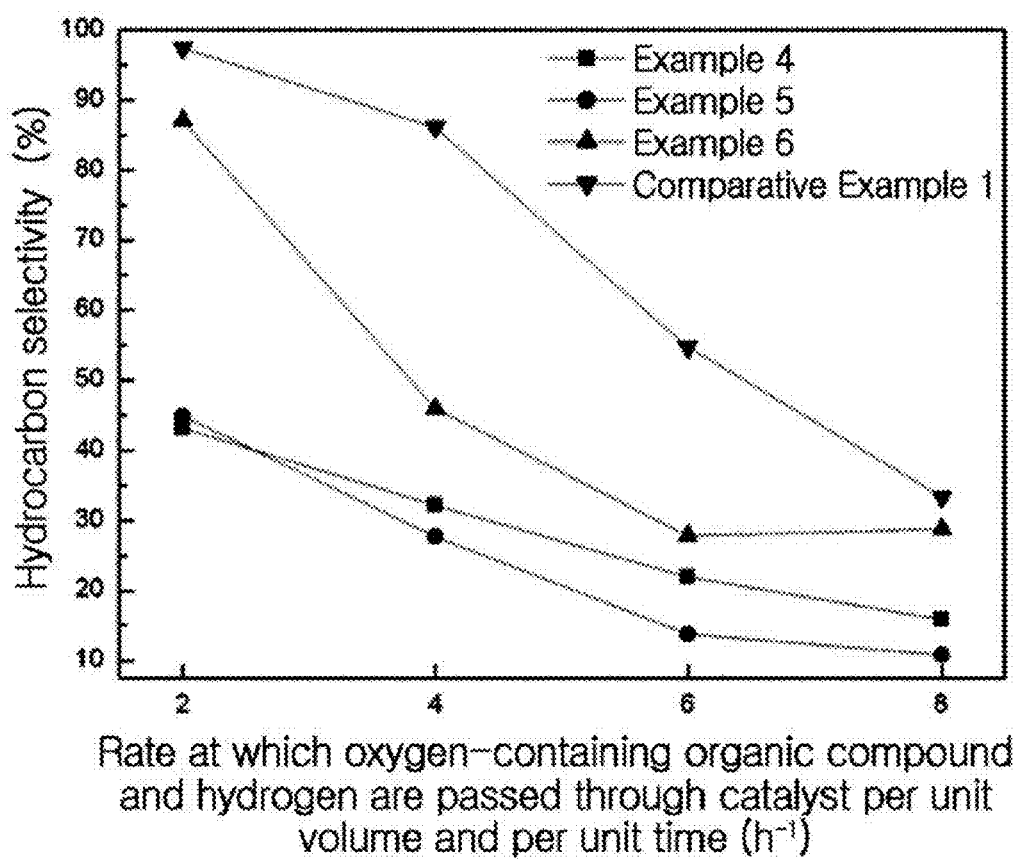
FIG. 5 shows hydrocarbon selectivity of a catalyst according to an exemplary embodiment of the present disclosure and an existing catalyst.

As seen from FIGS. 4 and 5, the conversion rate of the hydrocarbon products prepared in Examples 4-6 was 30-85% when the rate at which the oxygen-containing organic compound and the hydrogen are passed through the catalyst per unit volume and per unit time was 2 $h^{-1}$ and hydrocarbon selectivity was 45-87%. In particular, Example 6 showed an oleic acid conversion rate comparable to that of the currently used Co—$Mo/Al_2O_3$ catalyst (Comparative Example 1).

Accordingly, since the molybdenum carbide-supported catalyst according to the present disclosure allows easy formation of molybdenum carbide nanoparticles with high dispersibility using a supercritical solvent, hydrocarbons can be obtained with higher yield from oxygen-containing organic compounds. Furthermore, since sulfur compounds are not used for activation and performance maintenance of the catalyst unlike the existing catalysts, the hydrodeoxygenation process is ecofriendly with no emission of sulfur compounds. And, there is an economic advantage since consumption of hydrogen owing to vigorous side reactions such as methanation or water-gas shift reaction occurring when the existing noble metal catalysts are used can be reduced. In addition, since an oxygen-free renewable fuel is prepared, the problems associated with the use of the existing gasoline, diesel or FAME-based biodiesel can be solved.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing a molybdenum carbide-supported catalyst for hydrodeoxygenation, comprising molybdenum in the molybdenum carbide-supported catalyst, the method comprising:

dissolving a molybdenum precursor in a solvent, adding a carbon support to prepare a suspension and obtaining a carbon support on which molybdenum oxide particles are supported by supercritical solvent thermal synthesis, wherein the solvent is an alcoholic solvent that is used in the supercritical solvent thermal synthesis; and converting the molybdenum oxide particles supported on the carbon support to molybdenum carbide in a continuous reactor to obtain the molybdenum carbide-supported catalyst.

2. The preparation method according to claim 1, wherein the alcoholic solvent is a $C_1$-$C_{10}$ alcohol.

3. A method for preparing a molybdenum carbide-supported catalyst for hydrodeoxygenation, comprising molybdenum in the molybdenum carbide-supported catalyst, the method comprising:

dissolving a molybdenum precursor in a solvent, adding a carbon support to prepare a suspension and obtaining a carbon support on which molybdenum oxide particles are supported by supercritical solvent thermal synthesis; and converting the molybdenum oxide particles supported on the carbon support to molybdenum carbide in a continuous reactor to obtain the molybdenum carbide-supported catalyst, wherein the molybdenum precursor is molybdenyl acetylacetonate, molybdenum hexacarbonyl or molybdenum chloride.

4. The preparation method according to claim 1, wherein the supercritical solvent thermal synthesis is performed at 200-600° C. after adding the suspension to the reactor in an amount of 0.1-1.0 g/mL.

5. A method for preparing a molybdenum carbide-supported catalyst for hydrodeoxygenation, comprising molybdenum in the molybdenum carbide-supported catalyst, the method comprising:

dissolving a molybdenum precursor in a solvent, adding a carbon support to prepare a suspension and obtaining a carbon support on which molybdenum oxide particles are supported by supercritical solvent thermal synthesis; and converting the molybdenum oxide particles supported on the carbon support to molybdenum carbide in a continuous reactor to obtain the molybdenum carbide-supported catalyst, wherein, in said converting the molybdenum oxide particles supported on the carbon support to molybdenum carbide, the temperature inside the continuous reactor is raised at a rate of 1-10° C./min and the reaction is performed at 400-900° C.

6. The preparation method according to claim 2, wherein the supercritical solvent thermal synthesis is performed at 200-600° C. after adding the suspension to the reactor in an amount of 0.1-1.0 g/mL.

7. The preparation method according to claim 3, wherein the supercritical solvent thermal synthesis is performed at 200-600° C. after adding the suspension to the reactor in an amount of 0.1-1.0 g/mL.

8. The preparation method according to claim 5, wherein the supercritical solvent thermal synthesis is performed at 200-600° C. after adding the suspension to the reactor in an amount of 0.1-1.0 g/mL.

* * * * *